United States Patent
Junge

(10) Patent No.: US 10,108,998 B2
(45) Date of Patent: Oct. 23, 2018

(54) METHOD AND SYSTEM OF DIRECTED, TWO-WAY CONSULTATIVE COMMUNICATIONS BETWEEN A WEBPAGE USER AND A REMOTE REPRESENTATIVE

(71) Applicant: POINTERTOP, INC., Wilmington, DE (US)

(72) Inventor: Jason Junge, Scottsdale, AZ (US)

(73) Assignee: POINTERTOP, INC., Wilmington, DE (US)

( * ) Notice: Subject to any disclaimer, the term of this patent is extended or adjusted under 35 U.S.C. 154(b) by 332 days.

(21) Appl. No.: 14/757,792

(22) Filed: Dec. 23, 2015

(65) Prior Publication Data

US 2016/0189263 A1    Jun. 30, 2016

Related U.S. Application Data

(60) Provisional application No. 62/096,768, filed on Dec. 24, 2014.

(51) Int. Cl.
*G06Q 30/00* (2012.01)
*G06Q 30/06* (2012.01)
(Continued)

(52) U.S. Cl.
CPC ......... *G06Q 30/0619* (2013.01); *G06F 3/048* (2013.01); *G06F 3/1454* (2013.01);
(Continued)

(58) Field of Classification Search
CPC .......... G06Q 30/0619; G06Q 30/0617; G06Q 30/0631; G06Q 30/0641; G06Q 30/0281; G06F 3/1454
See application file for complete search history.

(56) References Cited

U.S. PATENT DOCUMENTS 6,094,673 A * 7/2000 Dilip .............. G06Q 10/10
709/202
7,707,149 B2 * 4/2010 Lee ................ G06Q 30/00
707/999.01
(Continued)

OTHER PUBLICATIONS

Qiu, Online Consumer Trust and Live Help Interfaces: The Effects of Text-to-Speech Voice and Three-Dimensional Avatars, 2010, International Journal of Human-Computer Interactions, vol. 19, p. 1-2 (Year: 2010).*
(Continued)

*Primary Examiner* — William J Allen
*Assistant Examiner* — Maria S. P. Heath
(74) *Attorney, Agent, or Firm* — Procopio, Cory, Hargreaves & Savitch LLP

(57) ABSTRACT

A method of providing directed, two-way consultative communications between a consumer and a customer service representative comprises: establishing a storyboard layout by a company to provide a guideline for the customer service representative to follow; receiving a request by the consumer for a consultation regarding a product or service offered by the company; initiating a two-way online web browser session between the consumer and the customer service representative; pushing content from customer service representative computing device to a consumer computing device, wherein the content is pulled from a server of the company and place in the storyboard layout; and returning data from the consumer computing device to the customer service representative device in response to the content pushed from the customer service representative computing device to the consumer computing device.

18 Claims, 15 Drawing Sheets

(51) Int. Cl.
*G06F 3/048* (2013.01)
*G06Q 30/02* (2012.01)
*G06F 3/14* (2006.01)

(52) U.S. Cl.
CPC ..... *G06Q 30/0281* (2013.01); *G06Q 30/0613* (2013.01); *G06Q 30/0617* (2013.01); *G06Q 30/0625* (2013.01); *G06Q 30/0631* (2013.01); *G06Q 30/0641* (2013.01)

(56) References Cited

U.S. PATENT DOCUMENTS

| | | | |
|---|---|---|---|
| 9,361,469 B2 * | 6/2016 | Thiyagarajan | G06F 21/62 |
| 9,419,821 B2 * | 8/2016 | Ilagan | H04L 12/66 |
| 2012/0324375 A1 * | 12/2012 | Mathews | G06F 17/30861 |
| | | | 715/760 |

OTHER PUBLICATIONS

Xerox, Remote Customer Support, 2009, Xerox, p. 1-2 (Year: 2009).*

* cited by examiner

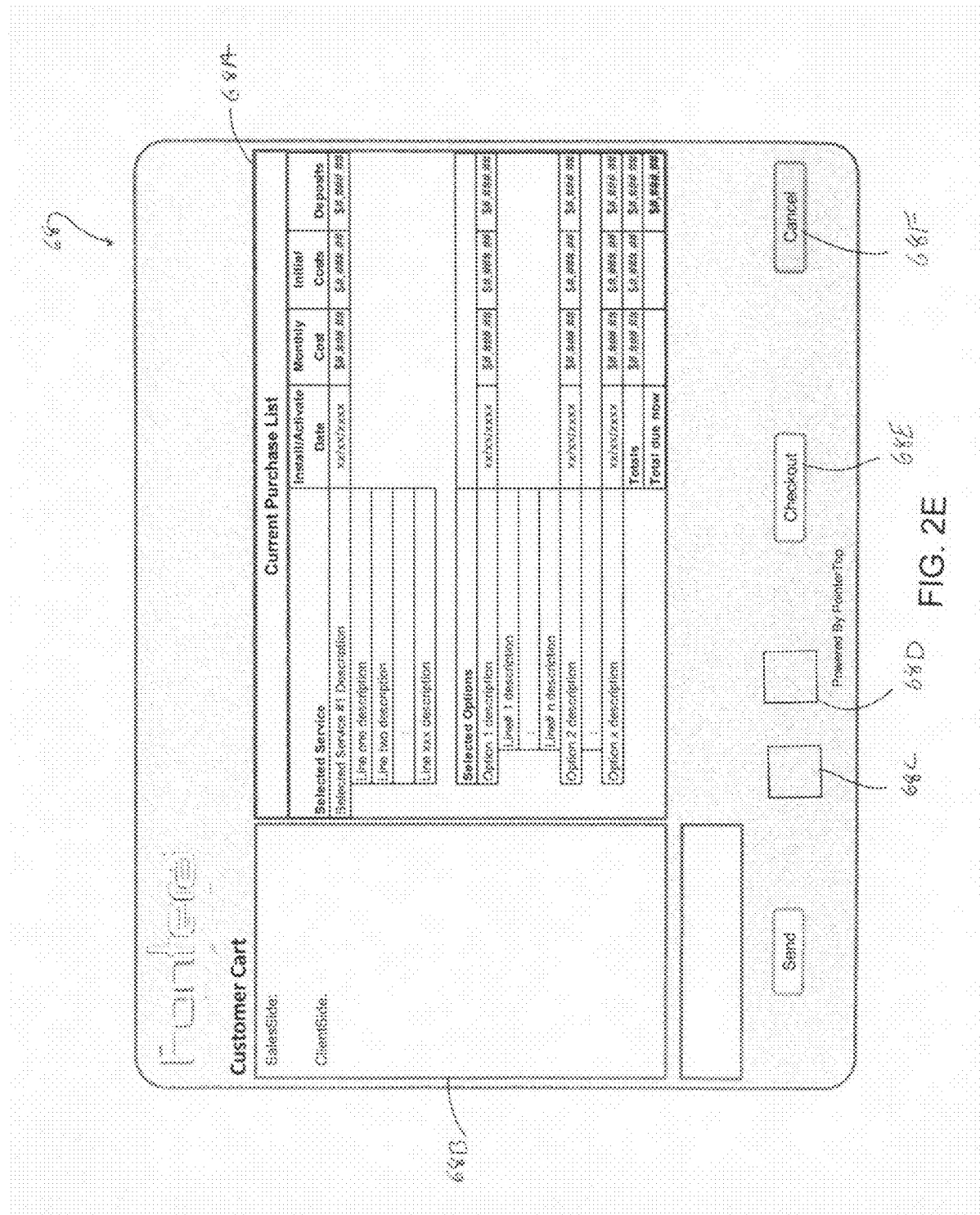

FIG. 2G

METHOD AND SYSTEM OF DIRECTED, TWO-WAY CONSULTATIVE COMMUNICATIONS BETWEEN A WEBPAGE USER AND A REMOTE REPRESENTATIVE

RELATED APPLICATIONS

The present application claims the benefit of U.S. Provisional Application No. 62/096,768, filed Dec. 24, 2015, entitled "METHOD AND SYSTEM OF DIRECTED, TWO-WAY CONSULTATIVE COMMUNICATIONS BETWEEN A WEBPAGE USER AND A REMOTE REPRESENTATIVE" in the name of Jason Andrew Junge, and which is incorporated herein by reference in its entirety.

FIELD

The present application generally relates to a telecommunication system, and, more particularly, to a system and method for establishing remote online consulting with a customer service representative.

BACKGROUND

One of the basic uses of the world-wide web is to facilitate mass remote commerce via automatically formatted lists of purchasing options on webpages presented to online consumers. These pages offer consumers purchasing or service options in graphical formats with accompanying information that has been created for mass consumption. Some online products or services may need a more personalized experience. Typically the products or services are represented by a single photograph of static product when in reality products or services may be more complex or customizable. Some online help may be in the form of a sales consultation, customized or tailored options, an explanation of context-specific uses, or direct support. However these types of personalized assistance are often provided in the form of non-graphical communications such as a phone or a chat box which are separate windows from the product or service page being browsed.

For large companies, a link may be provided to directly talk with a customer service representative associated with the company. Many large companies utilize telephone call centers to facilitate the receipt, response and routing of incoming telephone calls relating to customer service, retention, and sales. Generally, the customer is placed in contact with a customer service representative who is responsible for answering the customer's inquiries and/or directing the customer to the appropriate individual, department, information source, or service as required to satisfy the customer's needs.

While some companies may have in-house call centers to respond to customers' complaints and inquiries, many companies have found to be cost effective to hire third party telephone call centers to handle such inquiries. These third party telephone call centers may be located hundreds to thousands of miles away from the actual sought manufacturer/company. This often may result in use of inconsistent and subjective methods of monitoring, training and evaluating the customer service representatives. Further, many small companies may not have the time and/or funds to hire and train one or more customer service representatives whether the customer service representatives are located local or abroad.

Therefore, it would be desirable to provide a system and method that overcome the above identified concerns, as well as additional challenges which will become apparent from the disclosure set forth below.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a method of providing directed, two-way consultative communications between a consumer and a customer service representative is disclosed. The method comprises: establishing a storyboard layout by a company to provide a guideline for the customer service representative to follow; receiving a request by the consumer for a consultation regarding a product or service offered by the company; initiating a two-way online web browser session between the consumer and the customer service representative; pushing content from customer service representative computing device to a consumer computing device, wherein the content is pulled from a server of the company and place in the storyboard layout; and returning data from the consumer computing device to the customer service representative device in response to the content pushed from the customer service representative computing device to the consumer computing device.

In accordance with one aspect of the present application, a method of providing directed, two-way consultative communications between a consumer and a customer service representative is disclosed. The method comprises: receiving a request from the consumer for a consultation with the customer service representative regarding one of a product or service; initiating a two-way online web browser session between the consumer and the customer service representative; establishing two-way communication mechanism between the consumer and the customer service representative via the web browser, wherein the two-way communication mechanism is at least one of textual communication, graphical communication, video communication, and/or audio communication; pushing content from a customer service representative side web browser to a customer side web browser in real-time during the two-way online web browser session; and returning customer data from the consumer computing device to the customer service representative device in response to customer service representative data sent through the two-way communication mechanism and the content pushed from the consumer computing device to the customer service representative device.

In accordance with one aspect of the present application, a method of providing directed, two-way consultative communications between a consumer and a customer service representative is disclosed. The method comprises: establishing a storyboard layout by a company to provide a guideline for the customer service representative to follow; receiving a request by the consumer for a consultation regarding a product or service offered by the company; filtering the request for the consultation by a session manager based on information entered by the customer; sending the request for the consultation to at least one customer service representative meeting criteria established by the filter; accepting the request by a first of the at least one customer service representative meeting criteria established by the filtering to respond to the request; initiating a two-way online web browser session between the consumer and the customer service representative; establishing two-way communications between the consumer and the customer service representative via the web browser, wherein the two-way communications is at least one of: textual communication, graphical communication, video communication, and/or audio communication; pushing content from customer service representative computing device to a consumer computing device, wherein the content is pulled form a server of the company and place in the storyboard layout; and returning responses and feedback from the consumer computing device to the customer service representative device.

BRIEF DESCRIPTION OF THE DRAWINGS

Embodiments of the disclosure will become more fully understood from the detailed description and the accompanying drawings, wherein:

Figure 2G:
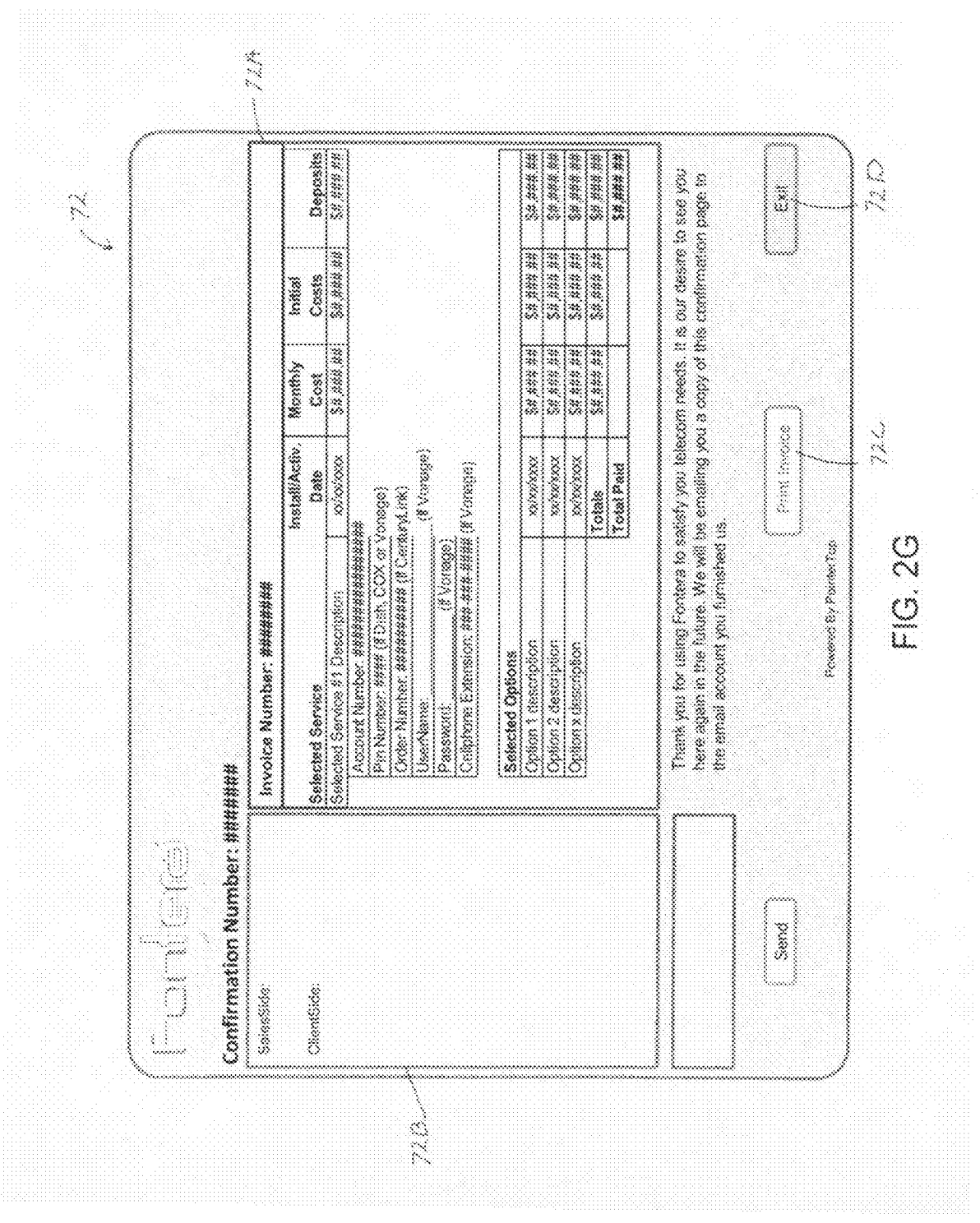

FIG. 2A-2G are web pages displayed on a customer's computing device according to an embodiment of the subject technology;

DESCRIPTION OF THE INVENTION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

A system and method is disclosed that may provide a platform to allow any company to provide remote consultations with a customer service representative. The system and method may provide a platform to allow any company to provide remote consultations with a customer service representative with minimal training of the customer service representative. The system and method may allow the consumer to initiate a sales, service, or training consultation session directly with a customer service representative directly within the webpage of the company or via successive webpages, upon pressing a button or link. This button or link gives a customer service representative computing device the ability to manipulate the consumer's webpage content with two-way communications functions such as, but not limited to, text, graphics, video, audio, chat, and shared whiteboards. The customer service representative may then be able to receive input from the consumer and return with information through the webpages to facilitate a one-on-one consultation, until either a sale is completed, or the consumer or the sales consultant terminate or abandon the session.

Figure 1:
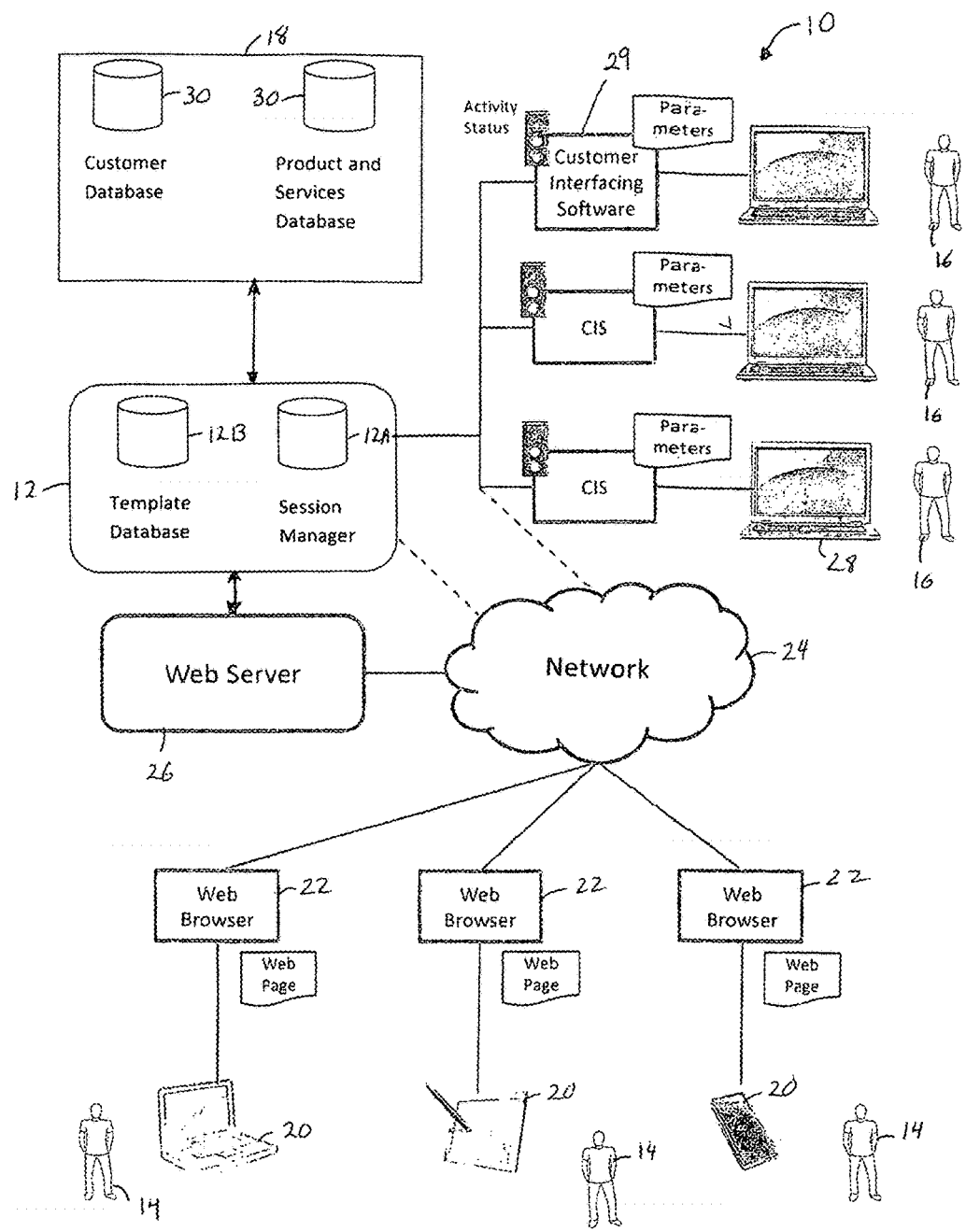
FIG. 1 is a block diagram of a network system for providing directed, two way consultative communications according to an embodiment of the subject technology.

Referring now to FIG. 1, a system 10 for providing a platform to allow any company to provide remote consultations with a customer service representative is shown. The system 10 may allow a service provider 12 to establish a platform that may allow two-way consultative communications between a costumer 14 visiting a website 26 of a company 18 and a remote customer service representative 16. The interface to allow two-way consultative communications is customizable to fit the needs of each company 18. The interface is customizable to provide unique looks and feels, presentations, consultant to scenario filters and the like. The interface may be open source to allow third party developers to create and sell other tools to allow remote consultations.

The service provider 12 may provide a template database 12A. The template database 12A may provide a modular layout of preformatted storyboards to allow a company 18 to provide a step-by-step modular layout for the remote customer service representative 16 to follow. The modular layout of preformatted storyboards may facilitate training and assures consistency and comprehensiveness among the remote customer service representative 16. The storyboards may be modified to fit the needs of each company 26 thereby allowing a customized presentation with unique look and feel. The storyboards may be loaded onto the web server 26 for use during the two-way consultative communications between the costumer 14 and the remote customer service representative 16. As stated above, since the interface may be open source, third party developers may be able to create and sell alternative industry or function specific storyboards.

The service provider 12 may have a session manager module 12B. The session manager module 12B may control the initiation, function, and termination of two-way interactive sessions between the customer 14 and the remote customer service representative 16. The session manager module 12B may allow different types of communication such as, but not limited to: audio, integrated VoIP, video, chat, questionnaires, and similar communication means. The session manager module 12B may provide design display tools such as white boards, engineering design tools such as CAD design programs, flowcharting design tools and the like. As stated above, since the interface may be open source, third party developers may be able to create and sell alternative productivity and/or communication tools. In accordance with one embodiment, the session manager module 12B may be loaded onto the web server 26.

In the system 10, the customer 14 may use one or more computing devices 20. The computing device 20 may be a personal computer system, tablet device, handheld or laptop device, mobile phone device, server computer system, multiprocessor system, microprocessor-based system, set top boxes, programmable consumer electronics, network PCs, and distributed cloud computing environments that include any of the above systems or devices, and the like. The computing device 20 may be described in the general context of computer system executable instructions, such as program modules, being executed by a computer system as may be described below.

The computing device 20 may be loaded with an operating system. The operating system of the computing device 20 may manage hardware and software resources of the computing device 20 and provide common services for computer programs running on the computing device 20. The computing device 20 may be loaded with a web browser 22. The web browser 22 may allow the computing device 20 to gain online access to a network 24 such as the World Wide Web. The web browser 22 may be Microsoft® Internet Explorer, Google® Chrome, Mozilla® Firefox, Apple® Safari or similar browsing applications. By connecting to the network 24, the computing device 20 may access different websites associated with one or more companies 18. The websites of the companies 18 may be hosted on a web server 26. The web server 26 may be hosted by the particular company 18 or by a third party host.

If one of the companies 18 would like to enable directed, two-way consultative communications between a costumer 14 visiting the website of the company 18 and a remote customer service representative 16, the company 18 may establish a hyperlink on the website of the company 18. The hyperlink may communicate with the session manager module 12B. The session manager module 12B may control the initiation, function, and termination of two-way interactive sessions with the customer 14. The session manager module 12B may processes data exchanged between the web browser 22 on the computing device 20 of the costumer 14 and a computing device 28 of a customer service representative 16. The session manager module 12B may download and forward customer profile information, product and service related information from one or more server databases 30 of the company 18. Information from the server databases 30 may be used during an interactive session to present product/service options and in some embodiments, customize the product according to a user profile as may be described below.

Figure 1A:
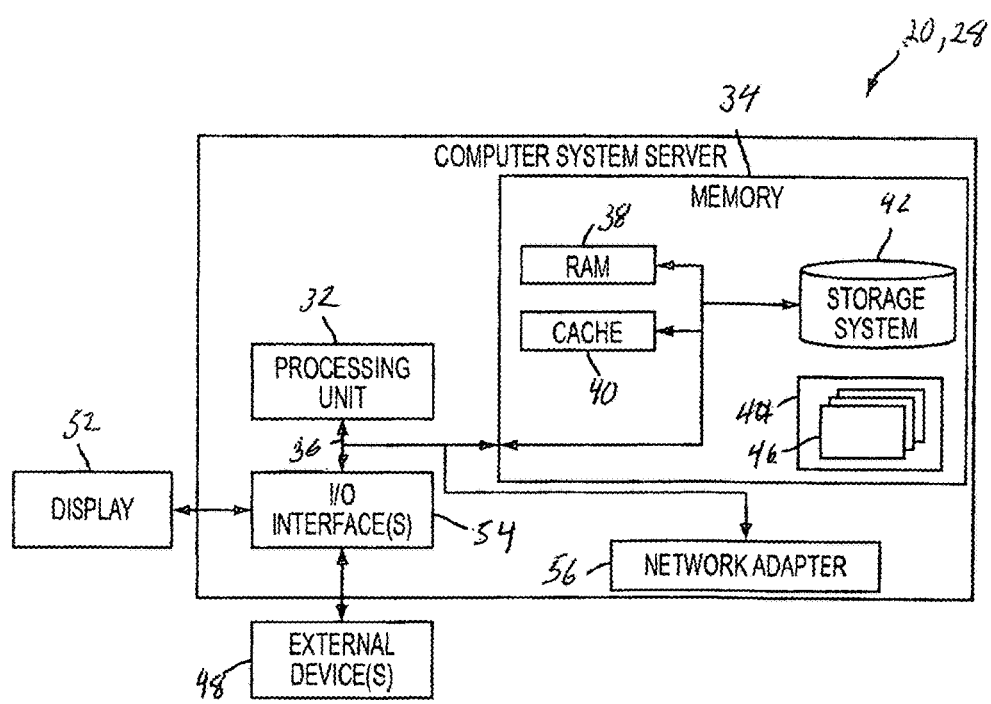
FIG. 1A is a block diagram of a general computing device according to an embodiment of the subject technology.
Figure 2A:
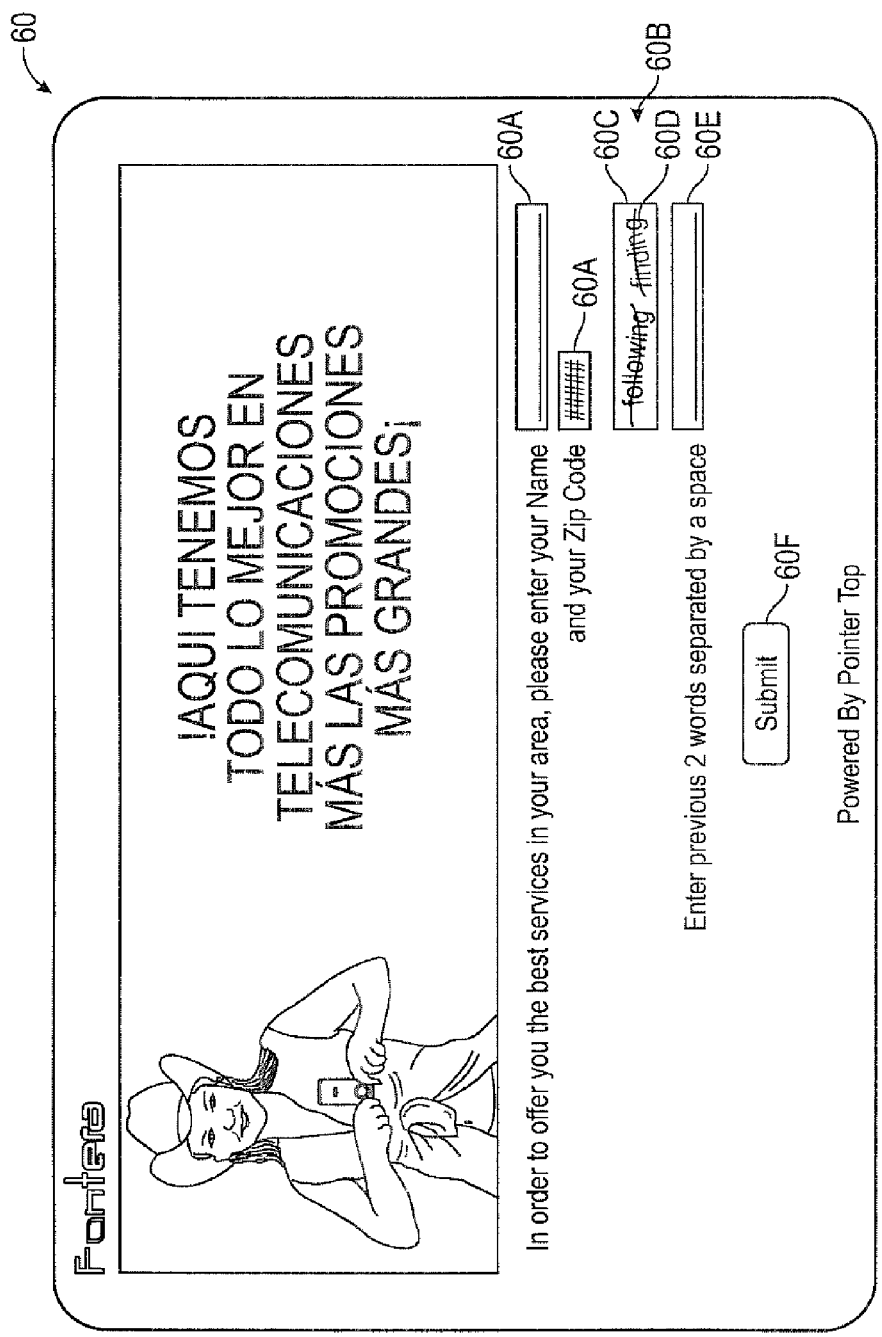
Figure 2B:
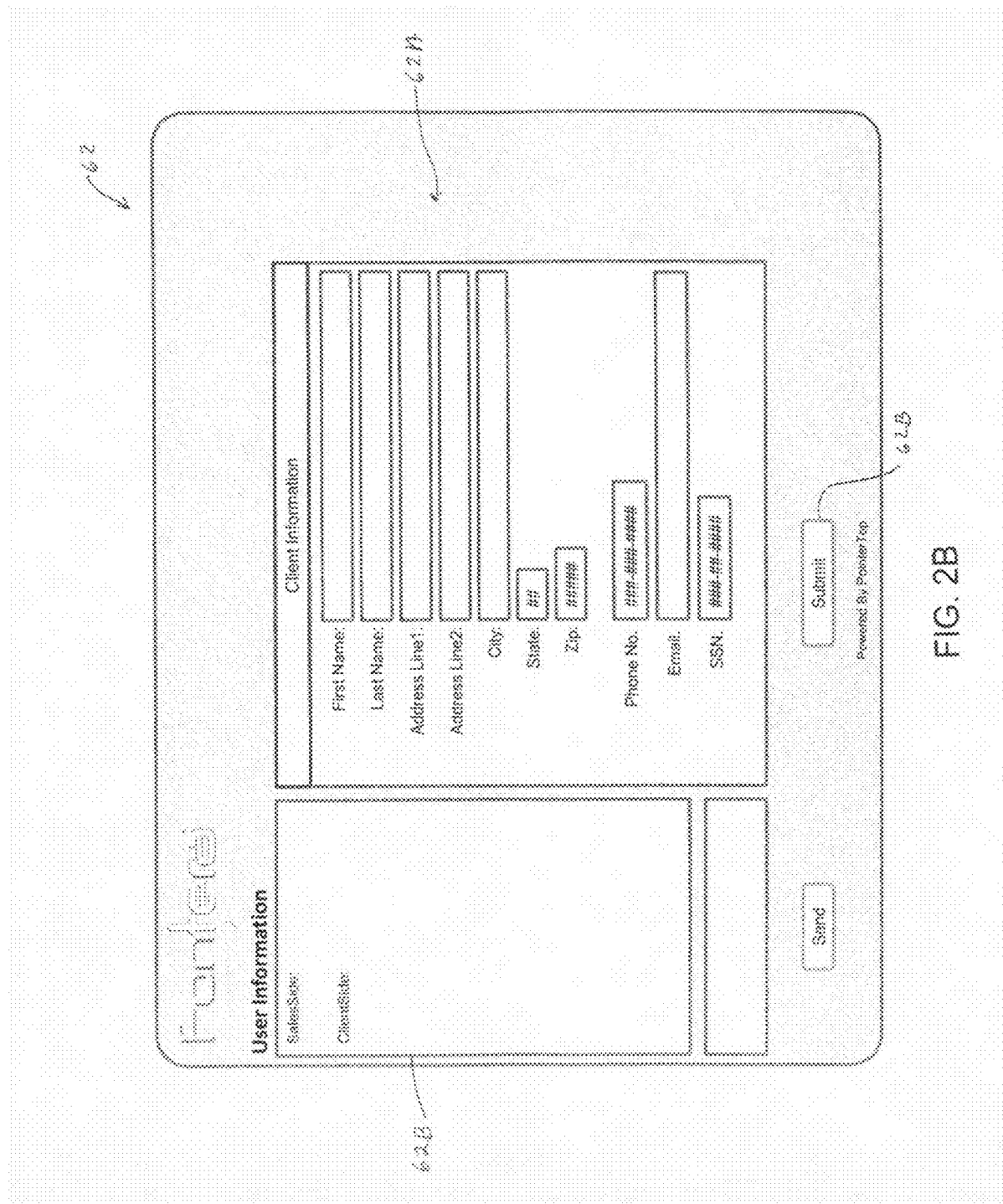
Figure 2C:
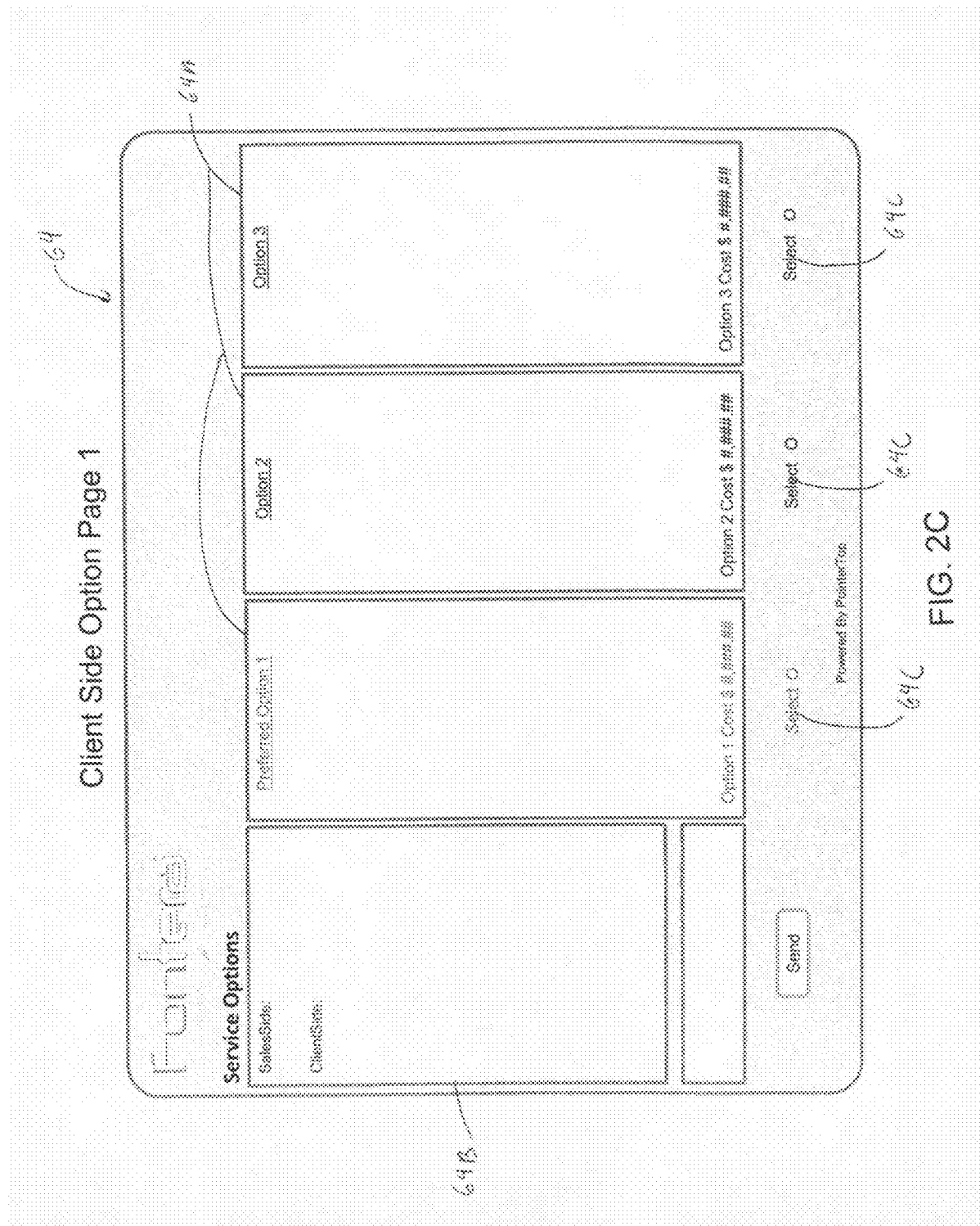
Figure 2D:
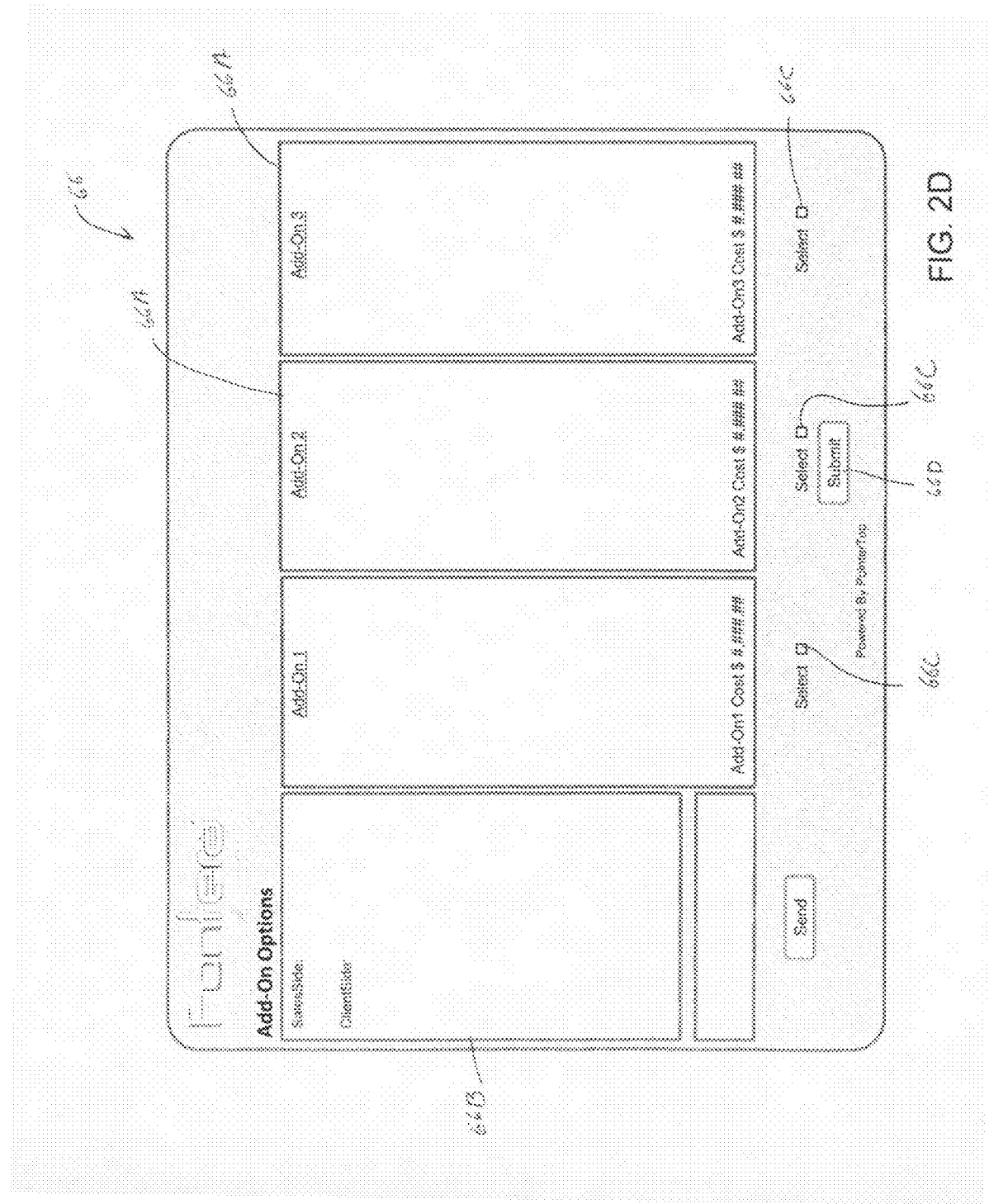
Figure 2F:
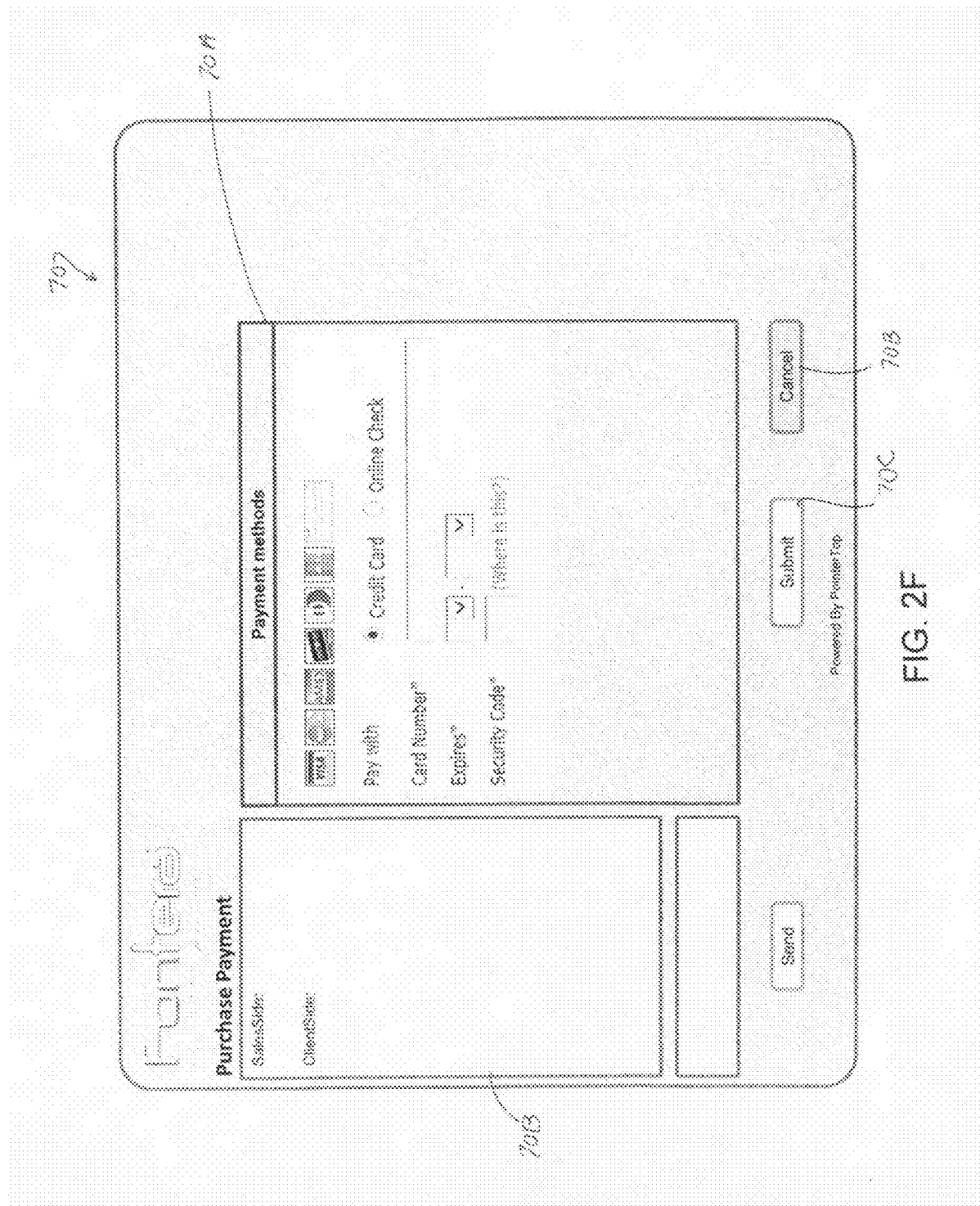
Figure 3A:
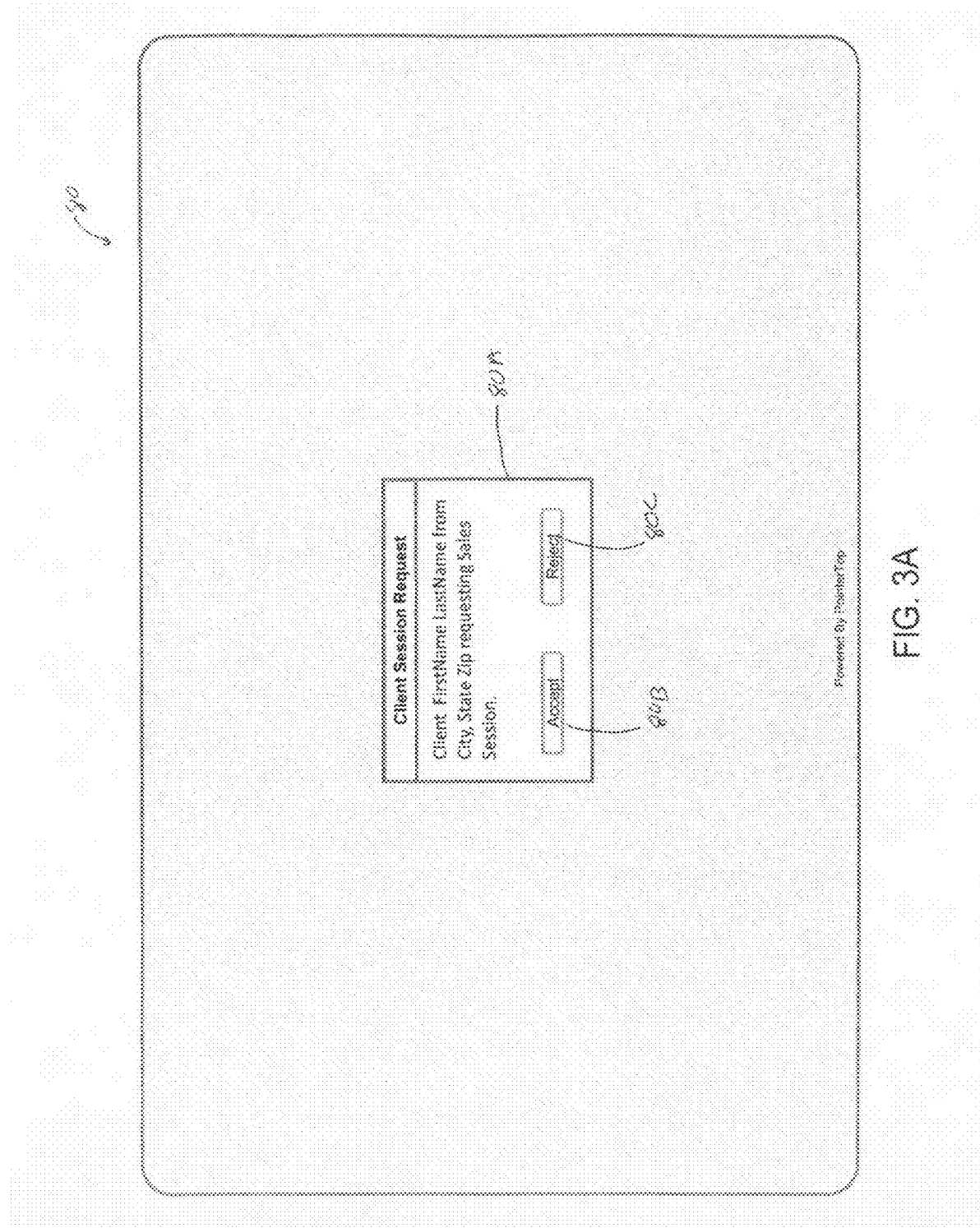
FIG. 3A-3E are web pages displayed on a customer service representative's computing device according to an embodiment of the subject technology.
Figure 3B:
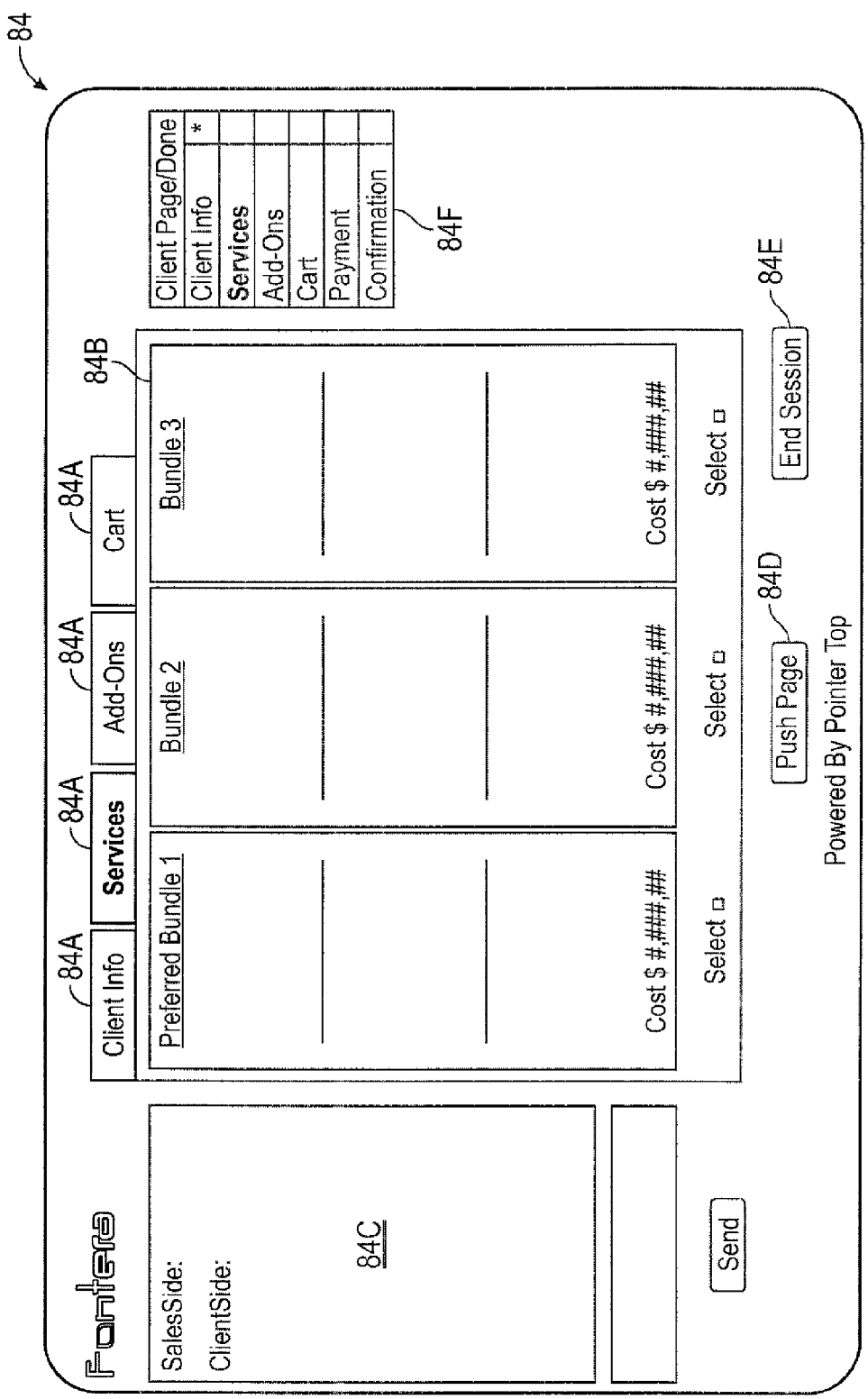
Figure 3C:
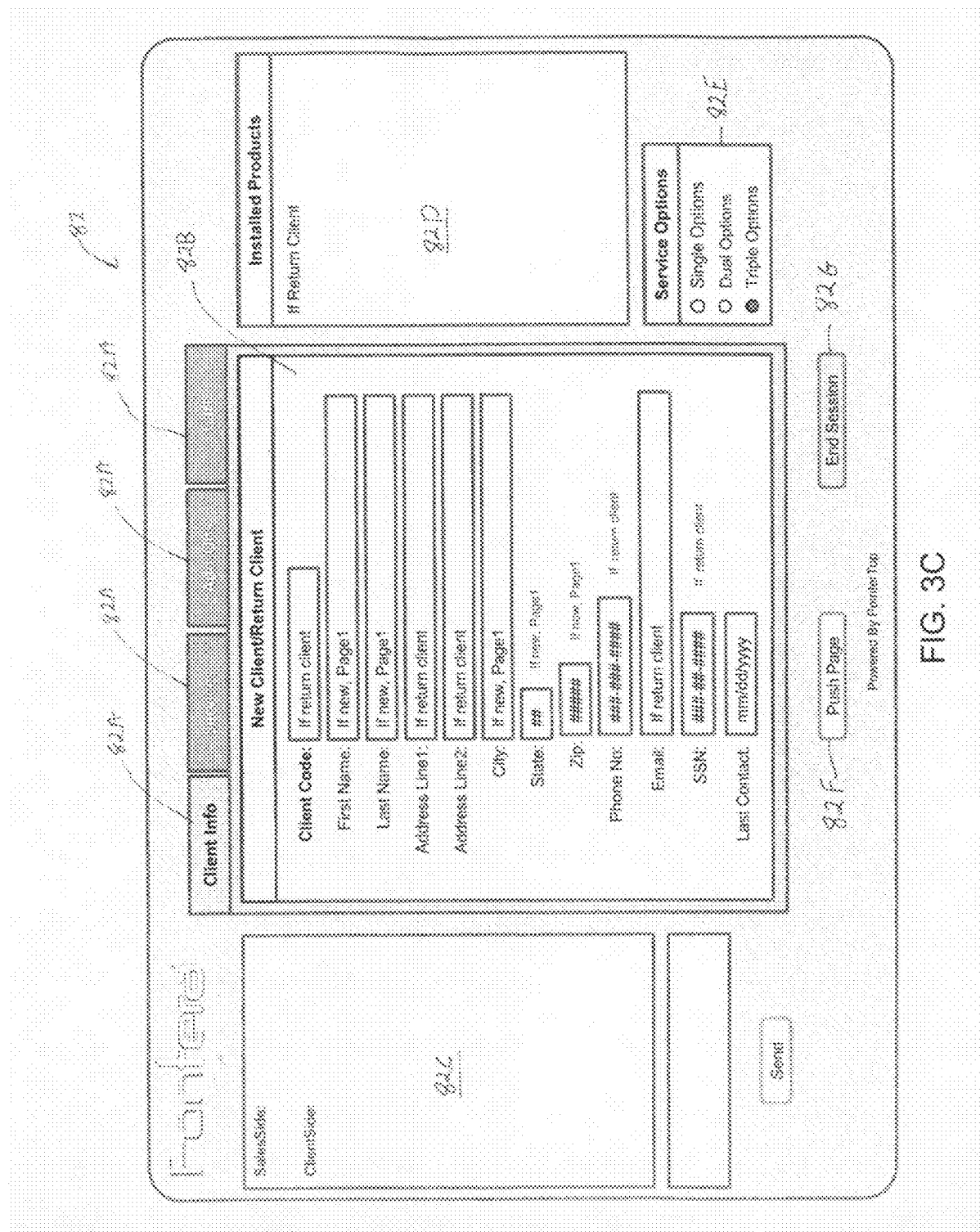
Figure 3D:
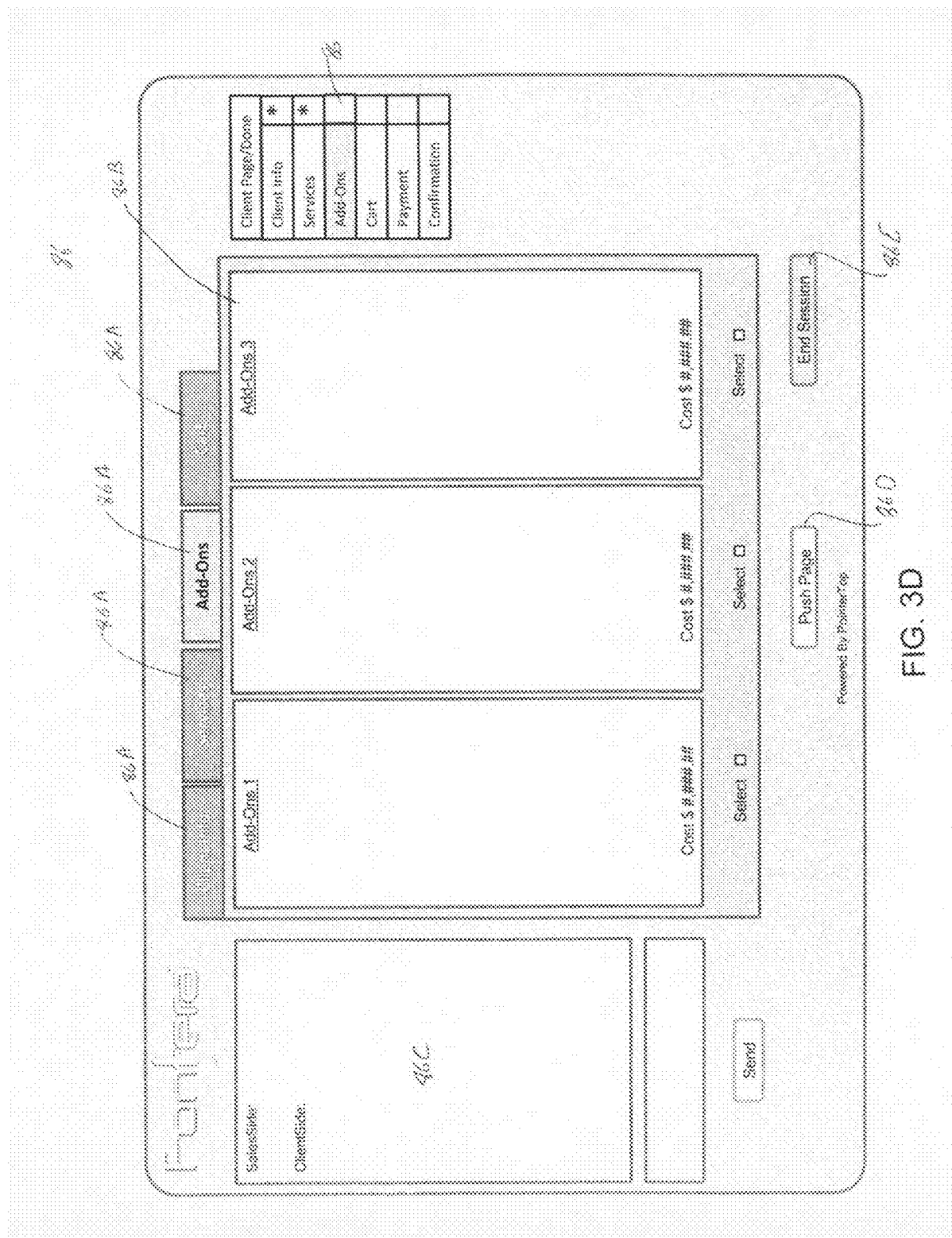
Figure 3E:
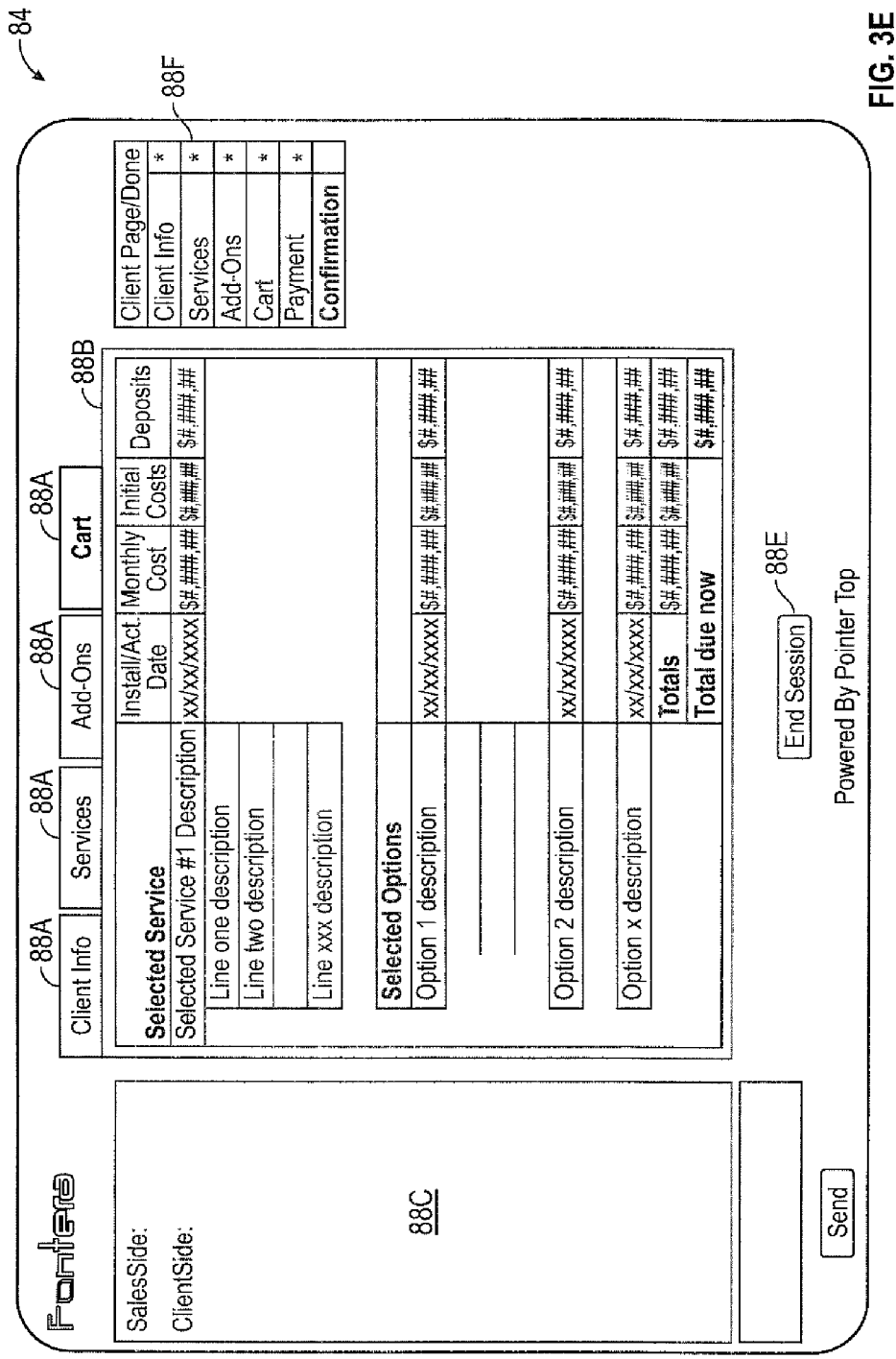
Figure 4:
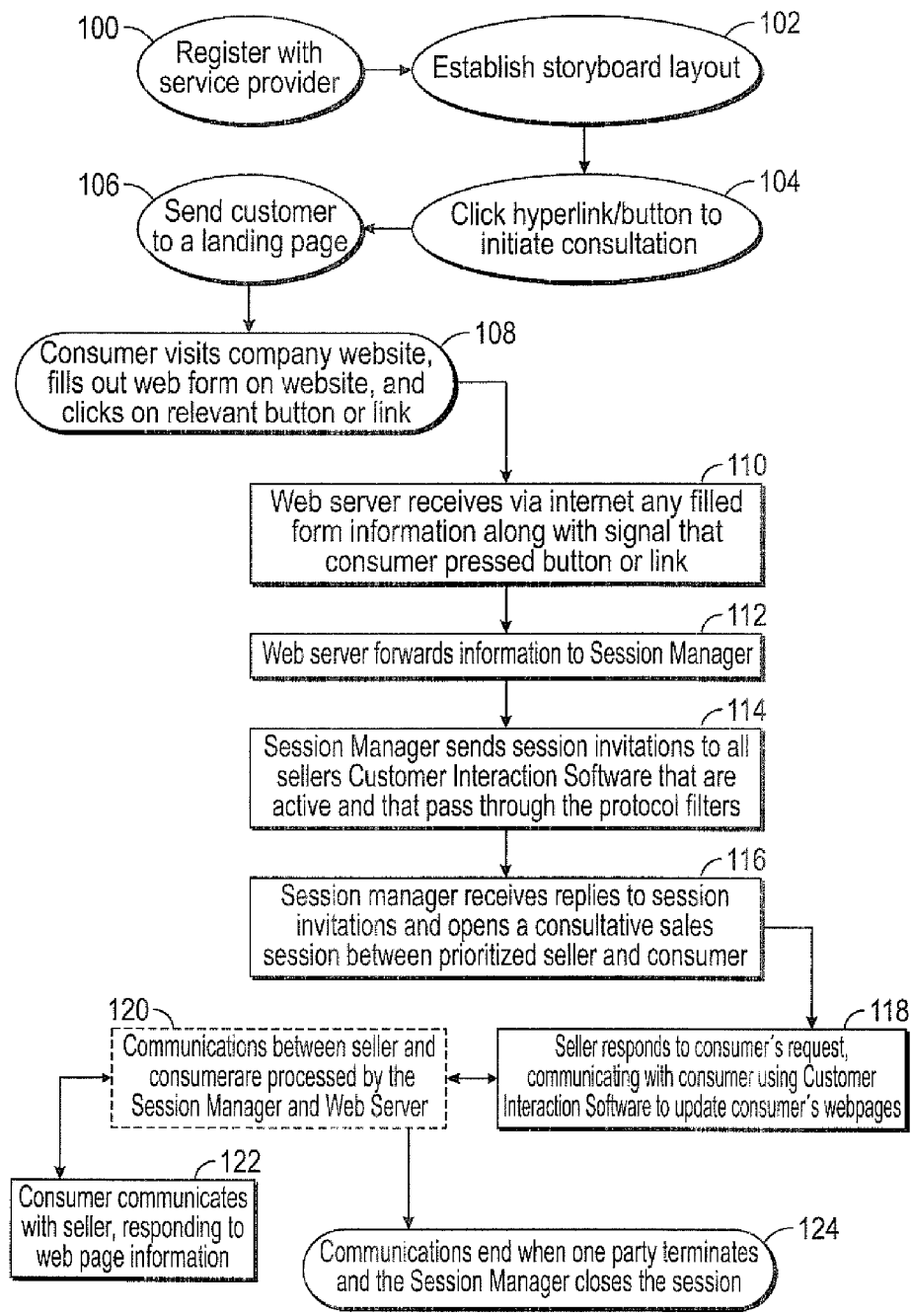
FIG. 4 is a flow chart of a method for providing directed, two way consultative communications in accordance with an exemplary embodiment of the subject technology.

Referring now to FIG. 1A, the computing devices 20 and 28 may be described in more detail in terms of the machine elements that provide functionality to the systems and methods disclosed herein. The components of the computing devices 20 and 28 may include, but are not limited to, one or more processors or processing units 32, a system memory 34, and a system bus 36 that couples various system components including the system memory 34 to the processor 32. The computing devices 20 and 28 may typically include a variety of computer system readable media. Such media could be chosen from any available media that is accessible by the computing devices 20 and 28, including non-transitory, volatile and non-volatile media, removable and non-removable media. The system memory 34 could include one or more computer system readable media in the form of volatile memory, such as a random access memory (RAM) 38 and/or a cache memory 40. By way of example only, a storage system 42 may be provided for reading from and writing to a non-removable, non-volatile magnetic media device typically called a "hard drive" (not shown).

The system memory 28 may include at least one program product 42 having a set (e.g., at least one) of program modules 44 that may be configured to carry out the functions of embodiments of the invention. The program product/utility 42 may have a set (at least one) of program modules 44. The program product/utility 42 may be stored in the system memory 34. The program modules 44 may include, but is not limited to, an operating system, one or more application programs, other program modules, and program data. Each of the operating system, one or more application programs, other program modules, and program data or some combination thereof, may include an implementation of a networking environment. The program modules 44 generally carry out the functions and/or methodologies of embodiments of the invention as described herein. For example, the program modules 44 may carry out the steps for initiating a two-way interactive online session, invoking one or more interactive features on a webpage during the session, and making determinations with respect to a customer's feedback and profile.

The computing device 20, 28 may also communicate with one or more external devices 48 such as a keyboard, a pointing device, a display 50, etc.; and/or any devices (e.g., network card, modem, etc.) that enable the computing devices 20, 28 to communicate with one or more other computing devices 20, 28. Such communication may occur via Input/Output (I/O) interfaces 54. Alternatively, the computing devices 20, 28 may communicate with one or more networks such as a local area network (LAN), a general wide area network (WAN), and/or a public network (e.g., the network 24 shown in FIG. 1) via a network adapter 56. As depicted, the network adapter 56 may communicate with the other components of the computing device 20, 28 via the bus 36.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 42) may be utilized. In the context of this disclosure, a computer readable storage medium may be any tangible or non-transitory medium that can contain, or store a program (for example, the program product 44) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Referring to FIGS. 1, 1A and 2A-G, one embodiment of a storyboard layout from a customer 14 side may be described. In this embodiment, the company 18 may be a sales company selling a particular product and/or service. For this particular embodiment, the company may be selling wireless phone services. However, this is just shown as an example and should not be seen in a limiting manner. The client may have a landing page 60. The landing page 60 may be a general landing page showing company information. Alternatively, the landing page 60 may be a reference landing page.

The reference landing page 60 may have user information areas 60A where the customer 14 may enter user information via an external device 48 of the customer's computing device 20. In the present embodiment shown in FIG. 2A, the landing page 60 is a reference landing page wherein the customer 14 may be asked to enter a customer name and a customer zip code. If the customer 14 is a returning customer, using cookies and saved profile data, requisite consumer information may automatically be loaded onto the landing page 60.

The reference landing page may have a verification area 60B. The verification area 60B may have a verification code display area 60C which may be used to display a verification code 60D. The verification code 60D may be any combination of alphanumeric characters. The verification area 60B may have a verification code enter area 60E. The verification code enter area 60E may be where the customer 14 may enter the verification code 60D shown in the verification code display area 60C via the external device 48 of the customer's computing device 20. The use of the verification area 60B may ensure that an actual customer 14 is accessing the landing page 60.

Once the customer information has been entered into the user information areas 60A and verification data is entered into the verification code enter area 60E, the customer 14 may press a submit/enter button 60F via an external device 48 of the customer's computing device 20.

Upon submitting the customer information, the customer 14 may be sent to a Client Information page 62. The Client Information page 62 may have additional user information areas 62A. The user information areas 62A may ask for additional information related to the customer 14 such as, but not limited to: contact address, contact phone number, contact email address, social security number and similar customer information. The customer 14 may enter the customer information using an external device 48 of the customer's computing device 20. Alternatively, or in addition to, if the customer 14 is a returning customer, using cookies and saved profile data, this information may automatically be loaded onto the user information areas 62A on the Client Information page 62. Once the client information has been entered into the user information areas 62A, the customer 14 may press a submit/enter button 62C via an external device 48 of the customer's computing device 20. Encryption software may be used when submitting the client information to ensure that authorized parties cannot read and access the customer information submitted. Once submitted, the customer data may be saved to the server databases 30 of the company 18 and the customer 14 may be sent to a Product/Service page 64.

The Client Information page 62 may have a communication tool area 62B. The communication tool area 62B may be any type of communication tool as described above. In the present embodiment, the communication tool area 62B is a chat box. However, this should not be seen in a limiting manner. The communication tool area 62B may allow directed, two way consultative communications between the customer 14 and a customer service representative 16. For example, on the customer 14 may want to inquiry the customer service representative 16 about the customer information that needs to be enters, i.e., home address, mailing address, etc. or why the customer's social security number is required. Using the communication tool area 62B, the customer 12 and customer service representative 16 may converse on any questions that may need to be asked/answered.

Once submitted, the customer data may be saved to the server databases 30 of the company 18 and the customer 14 may be sent to the Product/Service page 64. The Product/Service page 64 may be used to show different product/service options to the customer 14. Initially, the Product/Service Page 64 may show just the communication tool area 64B. Using the communication tool area 64B, the customer service representative 16 may ask questions as to the services/products the customer 14 is seeking. Based on the information provided by the customer 14 through the communication tool area 64B, the customer service representative 16 may provide a plurality of product/service options to the customer 14. The product/service options provided to the customer 14 may be displayed in one or more product/service option windows 64A. The customer service representative 16 may pull the product/service options from the server databases 30 of the company 18 and push this information to the product/service option windows 64A to be viewed by the customer 14 on the Product/Service page 64. In accordance with one embodiment, the first option may be a preferred option and shown in red and or highlighted to stand out. While reviewing the product/service option windows 64A, the customer 14 may ask the customer service representative 16 any questions regarding the different products/services displayed through the communication tool area 64B.

For example, if the customer was searching for cellular phone service from Company XYZ, the customer service representative 16 may pull the product/service options from the server databases 30 of the XYZ company 18 and push this information to the product/service option windows 64A. Thus, Option 1 may list a first plan, Option 2 may list a second plan and Option 3 may list a third plan. The plans selected and displayed on the Product/Service page 64 by the customer service representative 16 may be based on the information provided by the customer 14 through the communication tool area 64B.

Located under each the product/service option windows 64A may be a selection button 64C. The customer 14 may selected one of the product/service options displayed in one of the product/service option windows 64A by selecting/pressing a desired selection button 64C via an external device 48 of the customer's computing device 20. Once an option is selected, the product/service selected may be added to the Checkout Cart of the customer 14 and be presented to the customer service representative 16 on his computing device 28.

Once an option is selected, the customer 14 may be sent to an Add-On Option page 66. The Add-On Option page 66 operates in a similar fashion as the Product/Service page 64 with the exception that any combination (one or all) of the Add-On Options may be selected. The Add-On Option page 66 may display different product/service options the customer 14 may want to add. In general, the different product/service options are related to the product/service selected on the Product/Service page 64.

The customer service representative 16 may provide a plurality of Add-On product/service options to the customer 14. The Add-On product/service options may be displayed to the customer 14 in one or more Add-On option windows 66A. The customer service representative 16 may pull the Add-On options from the server databases 30 of the company 18 and push this information to the Add-On option windows 66A to be viewed by the customer 14. While reviewing the Add-On option windows 64A, the customer 14 may ask the customer service representative 16 any questions regarding the different products/services displayed through the communication tool area 66B.

In the previous example where the customer was searching for cellular phone service from Company XYZ, the customer service representative 16 may pull add-on options from the server databases 30 of the XYZ company 18 related to the service plan selected. These add-on options may be push to the Add-On option windows 66A. Thus, Add-On 1 may list insurance coverage, Add-On 2 may list text message service and Add-On 3 may list data download service.

Located under each the Add-On option windows 66A may be a selection button 66C. The customer 14 may select one or more of the add-on options displayed by selecting/pressing a desired selection button 66C via an external device 48 of the customer's computing device 20. Once an option is selected, the customer 14 may press a submit/enter button 66D via an external device 48 of the customer's computing device 20. The Add-On option selected may be added to the Checkout Cart of the customer 14 and be presented to the customer service representative 16 on his computing device 28. The customer 14 may then be sent to the Check-Out Cart page 68. If no Add-On options are selected, when the customer 14 presses the submit/enter button 66D, the customer 14 may be sent to Check-Out Cart page 68.

The Check-Out Cart page 68 may have a listing area 68A. The listing area 68A may show any product/services selected as well as any Add-On options selected by the customer 14. A communication tool area 68B may be provided to allow the customer 14 to ask the customer service representative 16 any questions.

The Check-Out Cart page 68 may have a "Go to Service" button 68C and/or a "Go to Add-On" button 68D. Selecting the "Go to Service" button 68C may notify the customer service representative 16 that the customer 14 is going back to the Product/Service page 64. Once the Product/Service page 64 has been reloaded, the customer may review and possible change the product/service selected. Similarly, selecting the Go to Add-On" button 68D may allow the customer 14 to change the Add-On options selection. Once the Add-On Option page 66 has been reloaded, the customer 14 may change the Add-On options selection. Alternatively, the customer service representative 16 may deselect the current selected Add-On options and load up to three new options.

After reviewing and agreeing with the listing area 68A showing any product/services selected as well as any Add-On options selected by the customer 14, the customer 14 may select/press a "Checkout" button 68E to accept the Cart data. Upon selecting/pressing the "Checkout" button 68E, the customer may be sent to a Payment page 70.

Alternatively, the customer 14 may select/press a "Cancel" button 68F to terminate the transaction. Even if the customer 14 selects/presses the "Cancel" button 68F, the system 10 may update the customer entry data as future lead, tie the communication tool and the Cart data as Wish List to the user record and notify the customer service representative 16. The customer service representative 16 may enter any notes or other data on his side and terminate the session.

The Payment page 70 may have a payment information area 70A. The payment information area 70 may allow the customer to enter payment information. For example, the payment information area 70 may have an area to allow the customer to select a credit card payment, online banking payment, third party online payment service and other payment methods. Once a particular payment method has been selected, the payment information area 70 may include areas to enter payment information such as credit card numbers, credit card expiration dates, security codes, banking account numbers and the like. Once the requisite information is entered into the payment information area 70A via an external device 48 of the customer's computing device 20, the customer may select/press a "Submit" button 70C via an external device 48 of the customer's computing device 20 to submit payment. Upon selecting/pressing the "Submit" button 70C, and acceptance of payment, the customer may be sent to a Confirmation page 72. Data of the transaction may be saved one or more server databases 30 of the company 18. If the payment was declined. The customer service representative 16 may inform the customer 14 via a communication tool area 70 to enter new payment information.

Alternatively, the customer 14 may select/press a "Cancel" button 70D to terminate the transaction. Even if the customer 14 selects/presses the "Cancel" button 70D, the system 10 may update the customer entry data as future lead, tie the communication tool and the Cart data as Wish List to the user record and notify the customer service representative 16. The customer service representative 16 may enter any notes or other data on his side and terminate the session.

The Confirmation page 72 may have an invoice information area 72A. The invoice information area 72A may show the products/services as well as any Add-On options purchased by the customer 14 as well as the cost associated with the purchase. A communication tool area 72B may be provided on the Confirmation page 72. The communication tool may allow the customer 14 to ask the customer service representative 16 any questions. The Confirmation page 72 may have a "Print" button 72C. The "Print" button 72C may be provided to allow the customer 14 to print a hardcopy of the invoice via a local printer. The communication tool 72B may allow the customer 14 to ask the customer service representative 16 any questions.

The Confirmation page 72 may have an "Exit" button 72D. The "Exit" button 72D may be provided to allow the customer 14 to terminate the session. Upon selecting/pressing the "Exit" button 72D via an external device 48 of the customer's computing device 20, data related to the transaction may be uploaded and saved to one or more server databases 30 of the company 18. The customer service representative 16 may enter any notes or other data on his side related to the transaction.

Referring to FIGS. 1-3E, one embodiment of a storyboard layout from a customer service representative 16 side may be described. After a customer 14 has submitted the customer information in the user information areas 60A and the verification data in the verification code enter area 60E, a customer service representative 16 may see a Session Announcement page 80 appear on their computing device 28. The Session Announcement page 80 may have a "Client Request" area 80A. The "Client Request" area 80A may show the customer's name, address, and the service/product related to the request. The "Client Request" area 80A may have an "Accept" button 80B and a "Reject" button 80C. The customer service representative 16 may select/press the "Accept" button 80B or "Reject" button 80C via an external device 48 of the customer service representative's computing device 28 to accept the session request or turn down the session request. If the session is rejected, then a time stamp and reason for rejection may be saved to a log file.

The system 10 is configured so that the session manager 12A may signal available customer service representatives 16. Thus, if a customer service representative 16 already has a predetermined number of customers 14 in a session queue, that customer service representatives 16 may not be sent any new Session Announcement pages 80 until the number of customers 14 in the session queue falls below a predetermined number. The session manager 12B may match a profile of the customer 14 to a particular skill set and/or knowledge of the customer service representatives 16. For example, if the customer 14 is Spanish speaking, then the session manager 12B may send the Session Announcement page 80 to Spanish speaking customer service representatives 16 or if the customer 14 is requesting information about a particular product line, the session manager 12B may send the Session Announcement page 80 to customer service representatives 16 who have experience with that product line. The above is given as an example and should not be seen in a limiting manner. The session manager 12B may be programmed with any type of filter which may send the Session Announcement page 80 to customer service representatives 16 having specific skill sets/abilities.

If the customer service representative 16 accepts the session, the customer service representative 16 may be sent to a customer sales/product page 82. The customer sales/product page 82 may have a plurality of tab members 82A. Each tab member 82A may display different display information. The initial customer sales/product page 82 may show tab member 82A set at "Client Info". With the tab member 82A set at "Client Info", a client information area 82B may be displayed. The initial customer sales/product page 82 may also have a communication tool area 82C, a product/service purchase area 82D, a product/service display option area 82E, a "Push Page" button 82F and an "End Session" button 82G.

Once the customer service representative 16 accepts the session, the customer service representative 16 may begin to interact immediately with the customer 14 to find out what the client's requirements are by using the communication tool area 82B. The customer service representative 16 may indicate to the customer 14 the need to fill in customer related information and may push the Client Information page 62 to the customer 14 by entering/pressing the "Push Page" button 82F via an external device 48 of the customer service representative's computing device 28.

Once the customer 14 has entered the data into the Client Information page 62 and selected/pressed the "Submit" button 62B via an external device 48 of the customer's computing device 20, the data may be displayed in the client information area 82B. The client information may be sent to the server 30 of the company 18 and saved to a Customer file (if data new or changed). At the same time an asterisk "f" may be placed in a "Done" box for this page to show that the customer 14 has entered the data. In general, this process of marking an asterisk "f" may be done for all customer service representatives' screens.

If the customer 14 is a repeat customer 14, the product/service purchase area 82D may show previous purchases by the customer 14. The customer service representative 16 may use this information to understand the customer's purchase history as well as to suggest different products/services to the customer.

The customer sales/product page 82 may have a product/service display option area 82E. The customer service representative 16 may use this area to enter the number of display options that may be shown to the customer 12. Thus, if the customer is only interested in a specific service/product to purchase, the customer service representative 16 may set the product/service display option area 82E to "Single Option" via an external device 48 of the customer service representative's computing device 28. If the customer 14 is interested in viewing multiple options on the product/service in question, the customer service representative 16 may set the product/service display option area 82E to "Triple Option" via an external device 48 of the customer service representative's computing device 28.

The customer sales/product page 82 may have an "End Session" button 82G. By selecting/pressing the "End Session" button 82G via an external device 48 of the customer service representative's computing device 28, the customer service representative 16 may end the session. If the session is terminated by the customer service representative 16 any information entered by the customer may be saved to the server database 30 of the company 18. A time stamp and reason for termination may be saved to a log file.

While the customer is filling in the Client Information page 62, the customer service representative 16 may begin to set-up the services/products screen 84 in response to the client's requirements stated above and any additional information provided to the service representative 16 by the customer 14 through the communication tool area 82B. To set-up the services/product screen 84, the customer service representative 16 may need to set the product/service display option area 82D to determine the number of options to be displayed to the customer 14. The customer service representative 16 may select/press the tab member 82A labeled "Services" to show the Services/Products display page 84.

The Services/Products display page 84 may have a plurality of tab members 84A. Selecting/pressing one of the tab members 84A may send the customer service representative 16 to a different page. In the Services/Products display page 84, the tab member 84A may be set to show one or more Product/Service display areas 84B. The number of Product/Service display areas 84B to be shown may be set in the product/service display option area 82E of the customer sales/product page 82. The customer service representative 16 may pull information related to the desired product/service requested from the customer 14 from one or more of the server databases 30 of the company 18. The pull information may then be placed into the Product/Service display areas 84B. The Product/Service display areas 84B may then be pushed to the customer 14 by selecting/pressing the "Push Page" button 84D via an external device 48 of the customer service representative's computing device 28 to show the Product/Service page 64 on the computing device of the customer 14.

The Services/Products display page 84 may have a communication tool area 84C. The communication tool area 84C may allow the customer 14 and the customer service representative 16 to communicate at any time while the customer service representative 16 has the Services/Products display page 84 open.

The Services/Products display page 84 may have an "End Session" button 84E. By selecting/pressing the "End Session" button 84E via an external device 48 of the customer service representative's computing device 28, the customer service representative 16 may end the session. If the session is terminated by the customer service representative 16 any information entered by the customer may be saved to the server database 30 of the company 18. A time stamp and reason for termination may be saved to a log file.

The Services/Products display page 84 may have a completion log 84F. The completion log 84F may indicate what information the customer 14 has entered. Any time a customer has entered the information in a designated page, an asterisk "f" may be placed in a "Done" box for that particular page to show that the customer 14 has entered the data.

Once the customer 14 has selected a desired product/service option window MA on the Product/Service page 64 via an external device 48 of the customer's computing device 20, the customer service representative 16 may go to Add-On page 86 by pressing the tab member 84A on the Services/Products display page 84.

The Add-On page 86 may have a plurality of tab members 86A. Selecting/pressing one of the tab members 86A may send the customer service representative 16 to a different page. The Add-On page 86 may have one or more Add-On display areas 86B. The customer service representative 16 may pull information related to the different accessory options associated with the product/service selected by the customer 14 from one or more of the server databases 30 of the company 18. This accessory information may be placed into one or more of the Add-On areas 86B. The Add-On areas 86B may then be pushed to the customer 14 by selecting/pressing the "Push Page" button 86D via an external device 48 of the customer service representative's computing device 28. The pushed information may then be shown on the Add-On Option page 66 on the computing device of the customer 14.

The Add-On page 86 may have a communication tool area 86C. The communication tool area 86C may allow the customer 14 and the customer service representative 16 to communicate at any time while the customer service representative 16 has the Add-On page 86 open.

The Add-On page 86 may have an "End Session" button 86E. By selecting/pressing the "End Session" button 86E via an external device 48 of the customer service representative's computing device 28, the customer service representative 16 may end the session at any time. If the session is terminated by the customer service representative 16, any information entered by the customer may be saved to the server database 30 of the company 18. A time stamp and reason for termination may be saved to a log file.

The Add-On page 86 may have a completion log 86F. The completion log 86F may indicate what information the customer 14 has entered. Any time a customer has entered the information in a designated page, an asterisk "f" may be placed in a "Done" box for that particular page to show that the customer 14 has entered the data.

Once the customer 14 has selected the desired Add-On options from the Add-On option windows 64A on the Add-On Option page 66, the customer 14 may select/press the "Checkout" button 68E on the Check-Out Cart page 68 via an external device 48 of the customer's computing device 20. By pressing the "Checkout" button 68E, a Checkout Cart page 88 may be displayed on the computing device 28 of the customer service representative 16.

The Checkout Cart page 88 may have a plurality of tab members 88A. Selecting/pressing one of the tab members 88A may send the customer service representative 16 to a different page. The Checkout Cart page 88 may have a checkout cart display area 88B. The checkout cart display area 88 may show all products/services and add-on items the customer added to the checkout cart and may wish to purchase. Other information related to products/services and add-on items selected may also be shown. This information may include, but is not limited to: description of the products/services and add-on items selected, quantity of each product/service and add-on items selected, price of each product/service and add-on items selected and similar information. The above is given as an example and should not be seen in a limiting manner.

The Checkout Cart page 88 may have a communication tool area 88C. The communication tool area 88C may allow the customer 14 and the customer service representative 16 to communicate at any time while the customer service representative 16 has the Checkout Cart page 86 open.

The Checkout Cart page 88 may have an "End Session" button 88E. By selecting/pressing the "End Session" button 86E via an external device 48 of the customer service representative's computing device 28, the customer service representative 16 may end the session at any time. If the session is terminated by the customer service representative 16, any information entered by the customer may be saved to the server database 30 of the company 18. A time stamp and reason for termination may be saved to a log file.

The Checkout Cart page 88 may have a completion log 88F. The completion log 86F may indicate what information the customer 14 has entered. Any time a customer has entered the information in a designated page, an asterisk "f" may be placed in a "Done" box for that particular page to show that the customer 14 has entered the data.

Referring now to FIGS. 1-4, a method for providing directed, two way consultative communications may be disclosed in accordance with an exemplary embodiment of the subject technology. Any company 18 who may like to establish the ability to provide remote consultations with a customer service representative 16 may register with the service provider 12 as shown in step 100. Upon registration, the company 18 may access the company 18 to access the template database 12A of the service provider 12. The company 18 may customize the preformatted storyboards to allow the company 18 to provide a step-by-step modular layout for the remote customer service representative 16 to follow as shown in step 102. The storyboards may be the webpage templates as shown in FIGS. 2A-3E as well as any audio, video or other instructions. For example, the company 18 may provide a written script for the customer service representative 16 to follow. The written script may include instructions on how to answer Frequency Asked Questions (FAQ) as well as how to handle any other issues/questions that may arise.

Consumers wanting a consultative sale may access the selling company's webpage and select/press a button/hyperlink to initiate a session as shown in step 104. Upon selecting/pressing the button/hyperlink via an external device 48 of the customer's computing device 20, the customer 14 may be sent to a landing page 60 as shown in step 106. The consumer 14 may fill out information requested on the landing page 60 and submit the information as shown in step 108 by selecting/pressing a "Submit" button via an external device 48 of the customer's computing device 20.

By submitting the requested information, the web server 26 receives the fill out information from the customer 14 as shown in step 110. Signals may be sent to the company's session-management server 12A as shown in step 112. The signals may contain the consumer's IP address, device, port information, a unique session ID, and/or any form information previously entered by the customer 14. The session-management server 12A then receives the signal from the consumer's computing device 20 and converts it into an invitation to start a consultative session, to be forwarded to customer service representative 16 having customer interfacing software 29 on their respective computers 28 as shown in step 114. Typically, customer service representatives 16 who are actively logged in to the session-management server 12 via their customer interfacing software 29 and flagged as active will be open to receive a "Session Announce" page 80 on their computing device 18. Protocols determine the priorities and abilities of the different customer service representatives 16 receiving the "Session Announce" page 80 and whether or not they are able to open more than one consultative session at a time.

The session-management server 12A then waits to receive the first signal of acceptance to the invitation. As soon as this signal is received, the session-management server 12A creates and opens an online two-way communication session between the accepting customer service representative 16 and the consumer 12 as shown in step 116. The two-way communication session may be textual communication, graphical communication, video communication, and/or audio communication. For example, initially, the customer service representative 16 and the consumer 12 may communicate via a chat box, VoIP call, video call or the like. During the initial communication session, the session-management server 12A downloads and sends any and all relevant consumer, service, and product information to the customer service representative 16 found on the one or more server databases 30 of the company 18 and configures the session's parameters based on this information.

The customer service representative 16 may push a Client Information page 62 to the computing device 20 of the customer 14 in order to obtain more information regarding the customer 14. While waiting for the customer's information, the customer service representative 16 may view a copy of the company's product or service web page so that the customer's needs for a personalized and/or customized experience can be seen by the customer service representative 16 throughout the two-way interactive session. The customer service representative 16 may send content it would like to publish from company's servers 30 based on the pre-configured parameters, and then on to the customer 14 for display on the computing device 20 of the customer 14 as shown in step 118. The content sent may be product/services offered by the company 18 as well as any add-on items that may be associated with the product/services offered.

In general, the customer service representative 16 may prepare a Services/Product display page 84 on the computing device 28 of the customer service representative 16 and push this content to the customer 14. The content may be displayed as the Product/Service page 64 on the computing device 20 of the customer 14. The customer service representative 16 may prepare an Add-On page 86 to show and describe items associated with the product/services being offered to the customer 14. The Add-On page 86 may be pushed to the customer 14 and viewed as the Add-On Option page 66 on the computing device 20 of the customer 14.

Once the customer 14 responses to the live published content and selects any products/services offered by the company 18 as well as any add-on items that may be associated with the products/services being offered, the customer may purchase the items via the Check-Out cart page 68 and Payment page 70. The purchase information may be sent through the web page to the session manager 12A back to the customer service representative 16.

The communications between the customer 14 and the customer service representative 16 may continue via the session manager 12A as shown in step 120. The communication may continue with information being pulled and pushed from the customer service representative 16 to the customer 14. The session may terminate once a purchase is made and/or the session is terminated by one of the customer 14 or customer service representative 16 as shown in step 124.

While in the above embodiments the customer service representative 16 was pushing textual information, the customer service representative 16 may be able to push and display text, video, audio, and graphics live onto the consumer's webpage. Thus, for example, the customer service representative 16 may push a video to show the customer 14 how to use a particular device/product being offered.

Also, the customer service representative 16 may be able to receive consumer feedback in the form of text, video, audio, and graphics published onto the customer service representative 16 web page as needed and allowed by the content on the webpages for the consultation. The consultation will continue until either the consumer or seller terminate or abandon the session, or conclude the session with a purchase, sending a signal to the session-management software to close the session.

In embodiments using a cloud-based system, the proprietary customer interfacing software may be omitted and instead sellers may log-in and interact with the system via unconnected web browsers.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

The foregoing description is illustrative of particular embodiments of the invention, but is not meant to be a limitation upon the practice thereof. The following claims, including all equivalents thereof, are intended to define the scope of the invention.

What is claimed is:

1. A method comprising:
   storing a storyboard layout to provide a guideline for a customer service representative to follow, wherein the storyboard layout comprises a plurality of available user interfaces;
   receiving a request from a consumer computing device for a consultation regarding an offering from a provider;
   initiating a two-way online session between the consumer computing device and a customer service representative device; and,
   during the two-way online session,
   in response to a selection of one of the plurality of available user interfaces at the customer service representative device, providing:
      (i) the selected available user interface comprising a plurality of areas into which content may be placed; and,
      (ii) a second user interface configured to enable placing of content from a server database into one or more of the plurality of areas of the selected available user interface;
   receiving, from a customer service representative device, a selection of content to be placed into one or more of the plurality of areas of the selected available user interface;
   in response to at least one operation at the customer service representative device, pushing the selected available user interface, including the selected content placed into the one or more areas of the plurality of areas, from at least one server to the consumer computing device, and
   providing data, that has been input into the pushed user interface at the consumer computing device, to the customer service representative device.

2. The method of claim 1, wherein the two-way online session comprises two-way communications between a web browser executing on the customer service representative device and a web browser executing on the consumer computing device.

3. The method of claim 1, comprising:
   filtering the request by a session manager according to one or more criteria; and
   assigning the request to at least one customer service representative meeting the one or more criteria.

4. The method of claim 3, wherein the filtering is based, at least in part, on information entered by a consumer at the consumer computing device.

5. The method of claim 2, wherein the two-way communications comprise one or more of textual communication, graphical communication, video communication, and audio communication.

6. The method of claim 1, wherein the pushed user interface comprises an offering webpage, and wherein the content comprises information, on the offering, that is retrieved from the at least one server.

7. The method of claim 1, wherein the pushed user interface comprises an add-on webpage, and wherein the content comprises information, on options, related to an offering, that are retrieved from the at least one server.

8. The method of claim 1, wherein the plurality of available user interfaces comprise a client information webpage comprising one or more inputs for receiving client information via the consumer computing device, and wherein the method further comprises, in response to at least one second operation at the customer service representative device, pushing the client information webpage from the at least one server to the consumer computing device.

9. The method of claim 1, wherein the plurality of available user interfaces comprise a checkout cart webpage comprising one or more inputs for receiving checkout information via the consumer computing device, and wherein the method further comprises, in response to at least one second operation at the customer service representative device, pushing the checkout cart webpage from the at least one server to the consumer computing device.

10. The method of claim 9, wherein the plurality of available user interfaces further comprise a payment webpage comprising one or more inputs for receiving payment information via the consumer computing device, and wherein the method further comprises, in response to at least one third operation at the customer service representative device, pushing the checkout cart webpage from the at least one server to the consumer computing device.

11. The method of claim 1, wherein the method further comprises, during the two-way online session, providing a customer service user interface to the customer service representative device, wherein the customer service user interface provides access to each of the plurality of available user interfaces in the storyboard layout and comprises one or more inputs for selecting each of the plurality of available user interfaces to be pushed to the consumer computing device.

12. The method of claim 11, wherein the storyboard layout further comprises an arrangement of the plurality of available user interfaces in a predetermined order, and wherein the customer service user interface provides access to each of the plurality of available user interfaces in the storyboard layout according to the predetermined order.

13. The method of claim 11, further comprising, during the two-way online session, providing a chat box for two-way communications within the customer service user interface and the pushed user interface.

14. A system comprising:
a memory that stores a storyboard layout to provide a guideline for a customer service representative to follow, wherein the storyboard layout comprises a plurality of available user interfaces; and
at least one processor configured to
receive a request from a consumer computing device for a consultation regarding an offering from a provider,
initiate a two-way online session between the consumer computing device and a customer service representative device, and,
during the two-way online session,
in response to a selection of one of the plurality of available user interfaces at the customer service representative device, providing:
 (i) the selected available user interface comprising a plurality of areas into which content may be placed; and,
 (ii) a second user interface configured to enable placing of content from a server database into one or more of the plurality of areas of the selected available user interface;
receiving, from a customer service representative device, a selection of content to be placed into one or more of the plurality of areas of the selected available user interface;
in response to at least one operation at the customer service representative device, pushing the selected available user interface, including the selected content placed into the one or more areas of the plurality of areas, from at least one server to the consumer computing device, and
providing data, that has been input into the pushed user interface at the consumer computing device, to the customer service representative device.

15. A non-transitory computer-readable medium having instructions stored thereon, wherein the instructions, when executed by a processor, cause the processor to:
store a storyboard layout to provide a guideline for a customer service representative to follow, wherein the storyboard layout comprises a plurality of available user interfaces;
receive a request from a consumer computing device for a consultation regarding an offering from a provider;
initiate a two-way online session between the consumer computing device and a customer service representative device; and,
during the two-way online session,
in response to a selection of one of the plurality of available user interfaces at the customer service representative device, providing:
 (i) the selected available user interface comprising a plurality of areas into which content may be placed; and,
 (ii) a second user interface configured to enable placing of content from a server database into one or more of the plurality of areas of the selected available user interface;
receiving, from a customer service representative device, a selection of content to be placed into one or more of the plurality of areas of the selected available user interface;
in response to at least one operation at the customer service representative device, pushing the selected available user interface, including the selected content placed into the one or more areas of the plurality of areas, from at least one server to the consumer computing device, and
providing data, that has been input into the pushed user interface at the consumer computing device, to the customer service representative device.

16. The method of claim 11, further comprising, during the two-way online session, providing a communication tool area for two-way communications within the customer service user interface and the pushed user interface.

17. The method of claim 16, wherein the communication tool area comprises a shared whiteboard.

18. The method of claim 16, wherein the communication tool area comprises an engineering design tool.

\* \* \* \* \*